United States Patent
Guichard

(10) Patent No.: US 8,718,417 B2
(45) Date of Patent: May 6, 2014

(54) DEVICE FOR MONITORING THE CORRECT OPERATION OF A PLURALITY OF DEVICES, NOTABLY ACTUATORS

(75) Inventor: Philippe Guichard, Chabeuil (FR)

(73) Assignee: Thales, Neuilly sur Seine (FR)

( * ) Notice: Subject to any disclaimer, the term of this patent is extended or adjusted under 35 U.S.C. 154(b) by 677 days.

(21) Appl. No.: 12/946,920

(22) Filed: Nov. 16, 2010

(65) Prior Publication Data

US 2011/0116075 A1    May 19, 2011

(30) Foreign Application Priority Data

Nov. 17, 2009 (FR) .................................. 09 05509

(51) Int. Cl.
*G02B 6/00* (2006.01)
*G02B 6/34* (2006.01)

(52) U.S. Cl.
USPC .................................. 385/12; 385/13; 385/37

(58) Field of Classification Search
None
See application file for complete search history.

(56) References Cited

U.S. PATENT DOCUMENTS

| 5,268,082 | A | * | 12/1993 | Oguro et al. | 204/282 |
| 5,493,390 | A |   | 2/1996  | Varasi et al. |  |
| 6,069,419 | A | * | 5/2000  | Tabib-Azar | 310/40 MM |
| 7,888,846 | B2 | * | 2/2011 | Ohtera et al. | 310/330 |
| 7,896,825 | B2 | * | 3/2011 | Atkinson et al. | 601/151 |
| 2005/0281505 | A1 | * | 12/2005 | Smith | 385/24 |
| 2007/0089795 | A1 | * | 4/2007 | Jacob | 137/827 |
| 2012/0201489 | A1 | * | 8/2012 | Zheng et al. | 385/12 |

FOREIGN PATENT DOCUMENTS

EP    1995171    11/2008

* cited by examiner

*Primary Examiner* — Michelle R Connelly

(74) *Attorney, Agent, or Firm* — Baker & Hostetler LLP

(57) ABSTRACT

A monitoring device for monitoring a plurality of microactuators includes an optical fiber with a plurality of sensors, each sensor being placed close to a microactuator and having optical properties varying as a function of at least one environmental parameter, the monitoring device also including a polling device with at least one transmitter/receiver for a fiber optic network, and processing means capable of modulating the frequency of the optical signal transmitted by the transmitter to select the sensor close to a given microactuator, and of comparing the received optical signal with a template characteristic of the correct operation of the microactuator, and of generating a resultant signal, representative of the correct operation of the monitored microactuator. The invention has applications in the field of health monitoring of vehicles, notably of aircraft.

14 Claims, 4 Drawing Sheets

DEVICE FOR MONITORING THE CORRECT OPERATION OF A PLURALITY OF DEVICES, NOTABLY ACTUATORS

CROSS-REFERENCE TO RELATED APPLICATION

This application claims priority to foreign French patent application No. FR 09 05509, filed on Nov. 17, 2009, the disclosure of which is incorporated by reference in its entirety.

FIELD OF THE INVENTION

The present invention relates to a device for monitoring the correct operation of a plurality of devices distributed in a structure, notably of actuators. It applies to the monitoring of the correct operation of items of equipment and of systems, notably applied in vehicles, and more particularly in aircraft.

BACKGROUND OF THE INVENTION

There are, notably in the transport field, an increasing number of onboard systems comprising a plurality of actuators distributed in a structure, sometimes in large numbers. The development of actuators of ever smaller dimensions allows a better integration of the latter and hence an increase in their number within a given system. In the aviation field, for example, it is desirable that an ever increasing number of actuators of various types are used in aircraft in order to allow an optimized management of the flight by precisely located actions. The said actuators are activated on the basis of measurements originating from a plurality of sensors of physical parameters. These sets of sensors and actuators participate in the flight of the aircraft by optimizing the energy budget amongst other functions. Finally, a second set of sensors monitors the detailed state of health of the vehicle in real time, usually called "health monitoring"; in this case, the sensors participate in heightening the safety of the flight and in optimized maintenance operations. Therefore, a developed aircraft wing is designed to contain a large population of items of microequipment dispersed throughout the latter. Such a wing may specifically comprise a plurality—several tens or even hundreds—of microactuators making it possible to supervise the air flows at precise points of the wing surface. In this way, a turbulent air flow located on a portion of the wing surface, detected by a sensor provided for this purpose, can be corrected as a laminar flow, by means of one or more microactuators situated close by.

There now follows a description of actuator types chosen as examples in order to clearly describe the invention: boundary-layer actuators. The invention can be applied with all types of known or future actuators, provided that the said actuators have a physical effect the thermal and/or acoustic signature of which can be measured, as is explained in greater detail below.

The abovementioned microactuators can for example be fluid microactuators, also commonly known by the name Plasma Synthetic Jet Actuators or by the corresponding acronym "PSJA". PSJA actuators take the form of small cavities containing a plasma, an electric arc heating the content of the cavity in order to produce a discharge of the air contained in the cavity, followed by an expansion. PSJA actuators can take the form of discrete components, or else the form of components of the micro-electromechanical systems type commonly called "MEMS", that is to say components that are micro-machined, for example in a collective manner with other components or circuits.

A PSJA actuator can be activated periodically with a certain frequency for the purpose of emulating a mechanical-vortex generator. The air exits and then enters a PSJA actuator in an alternating manner, which disrupts the air flow in its vicinity, making it possible to reduce the separation of the boundary layer. It is also possible to cite piezoelectric microactuators assembled in sets, and distributed over the wing surface, that are capable of generating a deformation of the surface of the latter on request.

It is possible also to cite MEMS micromotor-based microactuators, or else shape-memory alloy actuators or actuators of the artificial muscles type.

It should be noted that a system may comprise a plurality of items of equipment of one of the aforementioned types, but equally a heterogeneous plurality of sensors of various types.

It is desirable, for example, for a wing comprising a plurality of microactuators of the aforementioned types, that the partial or total failure of each of the actuators to be able to be detected. Specifically, the failure of a single actuator may have unfortunate consequences with respect to the aerodynamic flow around the whole surface of the wing, a contamination effect being able to rapidly extend an initially localized turbulent flow to the whole of the wing surface.

It is possible to attach to each microactuator an integrated monitoring device directly measuring the correct operation of the actuator. Nevertheless, such a solution may be detrimental in practice, because:

1) it supposes an increasing complexity of the microactuators;
2) such an increasing complexity notably brings with it an excessive cost of the monitoring function relative to the cost of the microsystem to which it is fitted;
3) the addition of an integrated monitoring device can be detrimental in terms of space requirement, the monitoring device necessarily providing a significant space requirement;
4) in the same way, the addition of a monitoring device to each microactuator results in a greater weight, which is detrimental to the flight performance of the aircraft;
5) each monitoring device has to be powered;
6) in any case, it is necessary to use a connection system that is made more complex in order to connect each monitoring device electrically and functionally to the associated microactuator, and the microsystems thus formed with a centralized management device;
7) each monitoring device itself has a susceptibility with respect to the environment; and
8) the quality of coverage of the test by the said integrated monitoring device is usually limited, only certain members of the actuator being monitored rather than the effective course of its action by its physical consequences.

SUMMARY OF THE INVENTION

One object of the present invention alleviates at least the aforementioned drawbacks, by providing a monitoring device making it possible to diagnose the correct operation of a plurality of items of equipment such as actuators, the monitoring device being both simple and not very demanding with respect to the weight of the system in which it is used.

One advantage of the invention is that the monitoring device is common to a plurality of items of equipment, these items of equipment being equally able to be of the same type as of heterogeneous types.

Another advantage of the invention is that the monitoring device imposes no additional lack of robustness relative to the thermal, mechanical and electric environment of the system in which it is used.

Yet another advantage of the invention is that the monitoring device provides no reliability penalty with respect to the system in which it is used.

Another advantage of the invention lies in the fact that the monitoring device makes it possible to ensure good coverage of the failure modes of the microactuators with which it is associated.

Accordingly, the invention provides a monitoring device for monitoring a plurality of microactuators comprising an optical fibre comprising a plurality of sensors, each sensor being placed close to a microactuator, and having optical properties that vary as a function of at least one environmental parameter, the monitoring device also comprising a polling device for a fibre optic network comprising at least one transmitter and one receiver, and processing means capable of modulating the frequency of the optical signal transmitted by the transmitter so as to select the sensor close to a given microactuator, and of comparing the received optical signal with a template characteristic of the correct operation of the microactuator.

According to one embodiment of the invention, the optical fibre can be of the monomode type, and the sensors can consist of a network of fibre optic sensors using Bragg interference networks, the processing means comparing the received optical signal with a thermal signature of microactuator.

According to one embodiment of the invention, the optical fibre can be of the monomode type, and the sensors can be formed by a Bragg network, the processing means comparing the received optical signal with a pressure signature of the microactuator.

According to one embodiment of the invention, the microactuators can be plasma synthetic jet microactuators.

According to one embodiment of the invention, the plasma synthetic jet microactuators can comprise two planar electrodes made on either side of a dielectric substrate.

According to one embodiment of the invention, the optical fibre can be placed in the structure of the dielectric substrate.

According to one embodiment of the invention, the optical fibre can be made in a cavity formed in the dielectric substrate, the sensor being made by deposited layers of material forming the fringes of an interference network.

According to one embodiment of the invention, the microactuators can be of the piezoelectric type.

According to one embodiment of the invention, the microactuators can be micromotors.

According to one embodiment of the invention, the microactuators can be shape-memory alloy actuators.

According to one embodiment of the invention, the microactuators can be of the artificial muscle type.

According to one embodiment of the invention, the microactuators can form a nonuniform population of actuators of different types among the following types: plasma synthetic jet microactuators, piezoelectric actuators, micromotors, shape-memory alloy actuators, artificial muscles.

According to one embodiment of the invention, the monitoring device can comprise synchronization means for synchronizing the comparative analysis of the signals with the actuation commands of the microactuators.

A further subject of the present invention is an aircraft wing, wherein a monitoring device as described above monitors a plurality of actuators placed on the wing surface, the sensors being placed along the optical fibre placed in the material of the wing, each of the sensors being placed close to an actuator.

BRIEF DESCRIPTION OF THE DRAWINGS

Other features and advantages of the invention will appear on reading the description, given as an example, made with respect to the appended drawings which represent.

DETAILED DESCRIPTION

The present invention uses a signature that can be appreciated via the measurement of physical parameters that are characteristic of the operation of the monitored actuators.

Devices for detecting operating anomalies of a device, which use the detection of physical phenomena characteristic of the malfunction of the device, for example abnormal vibrations, are known in themselves. This monitoring is of a continuous nature.

The device according to the invention uses a comparison of the expected physical consequence following the operation of the actuator with the physical consequence that is actually measured. "Physical consequence" is understood to be the change in physical parameters such as temperature or the characteristic vibration in the immediate vicinity of the actuator. This comparison is made each time the actuator is made to operate.

The device according to the invention uses a network of sensors making it possible to monitor a plurality of actuators independently of one another.

The device according to the invention comprises, for example, a unit for processing the measurements of the network of sensors which ensures the operation of the sensors on the one hand, the processing of the measurements so as to deliver information on the correct operation on the other hand. The processing unit comprises, for example, a module for the acquisition of the signals originating from the sensors, a signal-processing module, a transmission module. The processing unit is of any known technology for this type of equipment.

The network of sensors according to the invention may consist of conventional electric sensors of known type or, preferably, of sensors of an optical nature. The prior art discloses sensors arranged on an optical fibre in which interference networks known as "Bragg networks" are formed. A single fibre may in a known manner comprise a plurality of sensors forming a network, the sensors also being known as "nodes", or else "sensor-nodes". A monitoring device according to the invention may comprise such an optical fibre along which nodes forming the sensors are distributed. Each of these nodes corresponds to a microactuator to be monitored. Such a sensor of known type makes it possible to treat the nodes independently.

Figure 1:
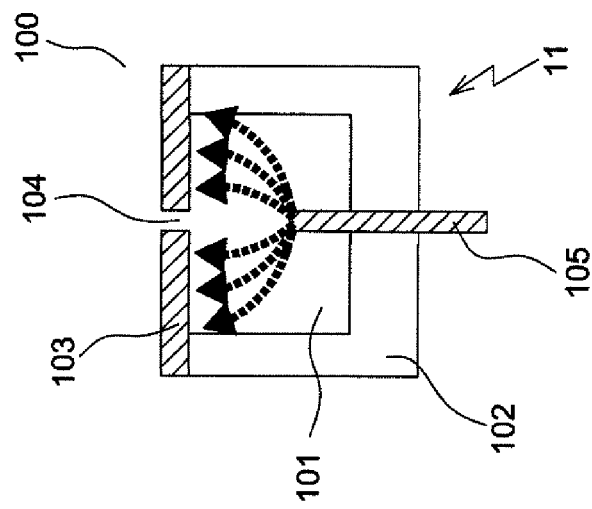
FIG. 1, a series of views in section of a PSJA microactuator in various characteristic phases of its operation.
Figure 1:
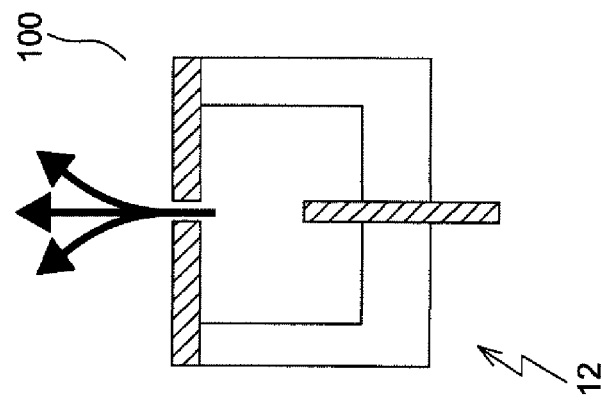
Figure 1:
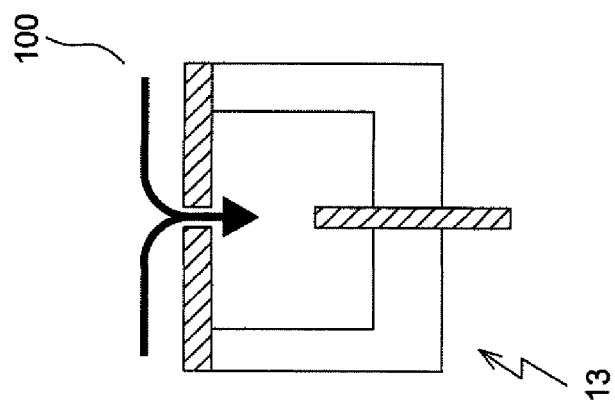

FIG. 1 shows a series of views in section of a PSJA microactuator in various phases characteristic of its operation.

In the example illustrated by FIG. 1, a PSJA microactuator 100 shown in three phases 11, 12, 13 characteristic of its operation comprises a cavity 101 surrounded by an armature 102, covered by a first electrode 103 in which an orifice 104 is made, the bottom of the armature 102 being traversed by a second electrode 105 showing through in the bottom of the cavity 101.

During the first phase 11, a deposit of energy is made by applying a considerable difference of potentials between the first electrode 103 and the second electrode 105. The air contained in the cavity 101 is thus heated.

During the second phase 12, a potential difference is applied between the first electrode 103 and the second electrode 105. The electric gradient thus present in the volume included in the cavity 101 causes the ionized air (or plasma) to be ejected through the orifice 104.

During the third phase 13, no difference of potentials is applied between the first electrode 103 and the second electrode 105, and the volume included in the cavity 101 refills with non-ionized air the temperature of which is substantially the ambient temperature.

Figure 2:
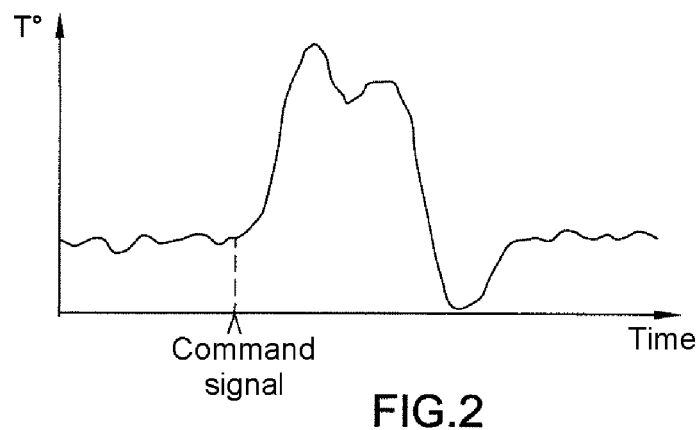
FIG. 2, a curve illustrating the characteristic thermal signature of the correct operation of a microactuator.

FIG. 2 shows a curve illustrating the thermal signature characteristic of the correct operation of a microactuator.

The curve shows an example of the change in temperature at a microactuator 100, with reference to FIG. 1, as a function of time, during an operating cycle of the microactuator 100.

It should be noted that the first phase 11 of operation of the microactuator 100, with reference to FIG. 1, is accompanied by an increase in the temperature of the air contained in the cavity 101; the temperature then typically follows a reduction during the second and third steps 12, 13. Similarly, the pressure of the air contained in the cavity 101 experiences a similar change during the three phases 11, 12, 13. Therefore, in operation, a PSJA microactuator 100 exhibits characteristic changes in the temperature and in the pressure of the air contained in the cavity 101. Hereinafter, these characteristic changes in temperature and pressure are respectively called thermal signature and pressure signature. In the same manner, actuators of other types to which the invention can be applied have characteristic signatures in operation. Any atypical operation of an actuator, for example in the event of failure, results in a signature that differs from the characteristic signature of its correct operation.

The present invention proposes to detect the thermal signature or pressure signature of an actuator and to compare it with the characteristic signature of its correct operation. The thermal signature can be detected by transmission of heat in the walls and the immediate environment of the structure accommodating the actuator. The pressure signature can be detected by vibratory or acoustic transmission through the structure of the actuator and the immediate environment of the structure accommodating the actuator. This is called the vibratory or acoustic signature.

The thermal or vibratory signature of correct operation of an actuator can be characterized in advance, and a template can be defined. This template can be stored in a dedicated unit for each actuator or each actuator type. An example of global structure of a monitoring device is described in detail below with reference to FIG. 6.

In a preferred exemplary embodiment of the invention, optical sensors can be placed along an optical fibre called a Bragg network fibre. A Bragg network fibre is known in itself from the prior art. The operation of this type of sensor is known in itself and consequently it is not described in detail in the present description. The characteristics that are important for the purposes of the invention for this type of sensor are:

the sensitive nodes or sensor nodes, that is to say the independent sensors placed along the optical fibre, must be individually accessible by processing the signal from a polling device;

the sensitive nodes and the optical fibre from the polling device must be of an optical nature without electrical conduction phenomena occurring;

the sensitive nodes may, for example, be sensitive to temperature or to vibrations, depending on their geometry and that of their accommodating structure.

For example, a monomode optical fibre comprises interference networks etched into it in the form of fringes which each reflect a very precise specific wavelength. Such interference networks are extremely sensitive notably to variations in temperature; specifically, if the optical fibre is locally stretched or contracted, the distance between the fringes is respectively reduced or increased, and the reflected wavelength is modified accordingly. If each sensitive node of the optical fibre is kept in a system that sustains few stresses, for example sunk into the structure of the wing, the main cause of its stretching or its contraction is the variation in temperature.

A monitoring device can, for example, comprise a laser emitter emitting in the optical fibre along which sensors forming a Bragg network are placed. The emission can be achieved over a given range of wavelengths; a poll can then be made by varying the frequency of the laser. In this way, a study of propagation time can make it possible to precisely locate the position in which the wave is reflected along the optical fibre, and therefore the sensor node from which a signal is detected. An analysis of the optical signal received by a receiver makes it possible to quantify the variations in temperature at this sensor. A given sensor can be selected by a judicious choice of the laser frequency, a frequency of the laser beam being able to be reflected by the chosen sensor, while all the other sensors are transparent to it.

It should be noted that, in a similar manner, it is possible to quantify, if necessary by means of specific filters, transducers and/or amplifiers, variations in pressure or else acoustic or electromagnetic waves or even mechanical deformations. Advantageously, it is therefore possible to carry out the monitoring of a nonuniform population of items of equipment via a device as described above. Preferably, the sensor nodes must be placed in the immediate vicinity of the actuators or other items of equipment to be monitored, so that the attenuation of the signal to be measured is as little as possible, as is the time constant associated with the signal propagation time. "Immediate vicinity" in this instance means a distance which corresponds to an acceptable attenuation for the detection and location of the thermal or acoustic propagation, depending on the chosen type of signature.

It is also possible for the sensors to be of another type, for example electric or piezoelectric. Therefore, the device according to the invention can also be made with a set of conventional electric thermometers.

Figure 3:
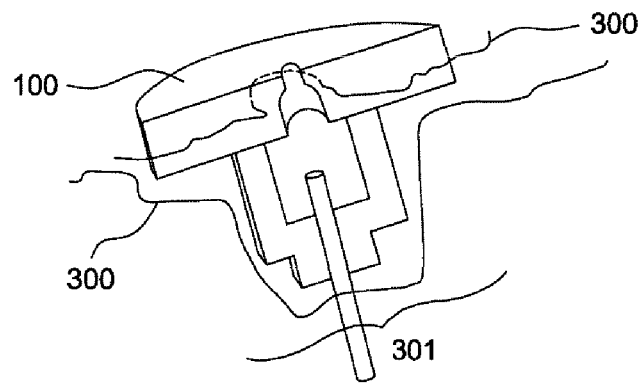
FIG. 3, a view in section illustrating the positioning of a unitary sensor with respect to a PSJA microactuator, in an exemplary embodiment of the invention.

Examples of positioning of an optical fibre close to actuators, or in a network of actuators, are illustrated by FIGS. 3 to 5.

FIG. 3 shows a view in section, in perspective, illustrating the positioning of a unitary sensor with respect to a PSJA microactuator in an exemplary embodiment of the invention.

In the example illustrated by FIG. 3, an optical fibre 300 can be placed under the microactuator 100 so that a sensor node 301 runs around the cavity 101 while remaining close to it. This embodiment, for example, allows easy maintenance with the possibility of replacing a faulty microactuator 100, the fibre 300 remaining in place, and being for example sunk into an accommodating structure.

In an alternative embodiment, it is also possible for the fibre 300 to be placed in the structure of the first electrode of the microactuator 100.

Figure 4A:
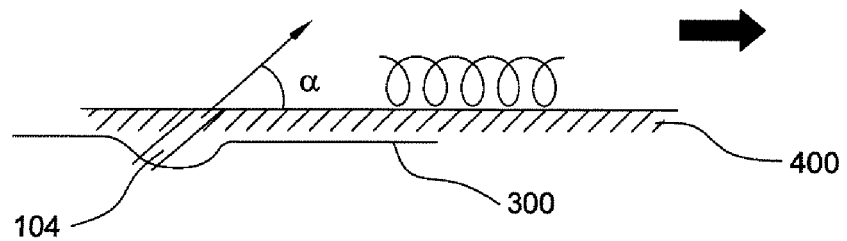
FIGS. 4a and 4b, respectively a view in section and a top view illustrating the positioning of a plurality of unitary sensors with respect to a plurality of PSJA microactuators, in an exemplary embodiment of the invention.
Figure 4B:
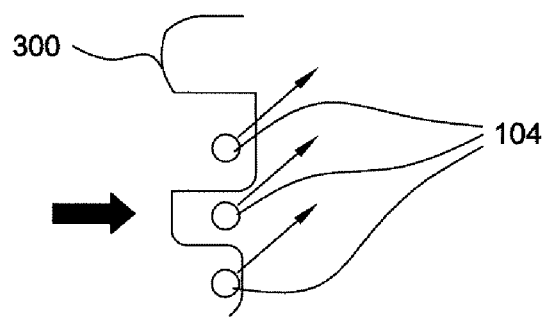

FIGS. 4a and 4b show respectively a view in section and a top view illustrating the positioning of a plurality of unitary sensors with respect to a plurality of PSJA microactuators in an exemplary embodiment of the invention.

In the example illustrated by FIG. 4a, a portion of the suction surface 400 of an aircraft wing is shown in a view in lateral section. A PSJA microactuator can be sunk into the structure of the wing so that its orifice 104 is arranged so that the light stream of air expelled by the microactuator forms an angle α with the tangent to the surface of the wing.

The optical fibre 300 can be sunk into the structure of the wing, and a sensor node can be placed close to the microactuator running round the orifice 104.

As illustrated by FIG. 4b, a plurality of microactuators can be placed, for example in a straight line, along the suction surface of the wing. The same optical fibre 300 can be placed so as to present sensor nodes close to each of the orifices 104 of the various microactuators while running round the orifices 104.

Figure 5A:
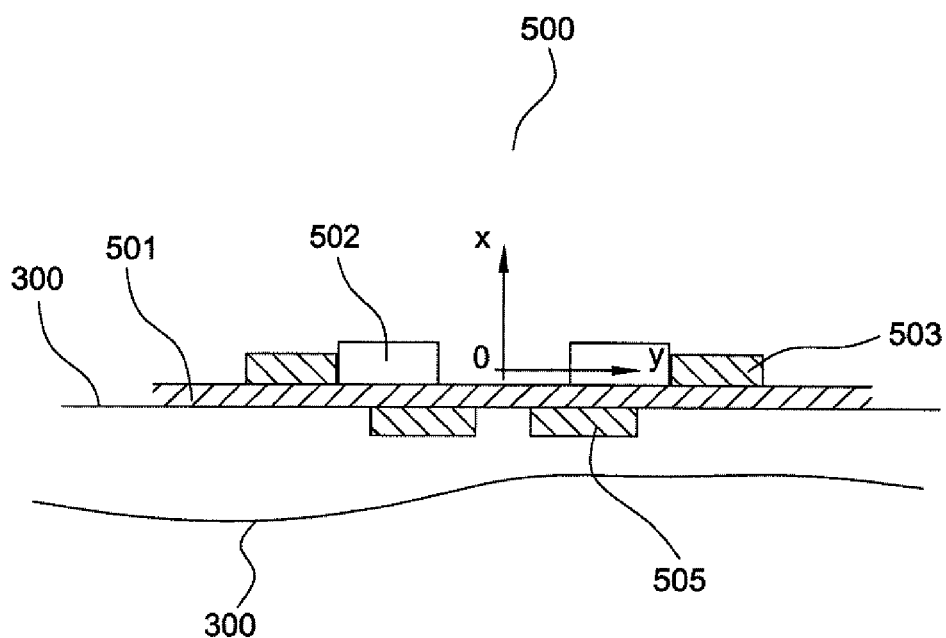
FIGS. 5a and 5b, the positioning of a unitary sensor with respect to a micro-machined PSJA microactuator in an exemplary embodiment of the invention, respectively in a view in lateral section and a top view.
Figure 5B:
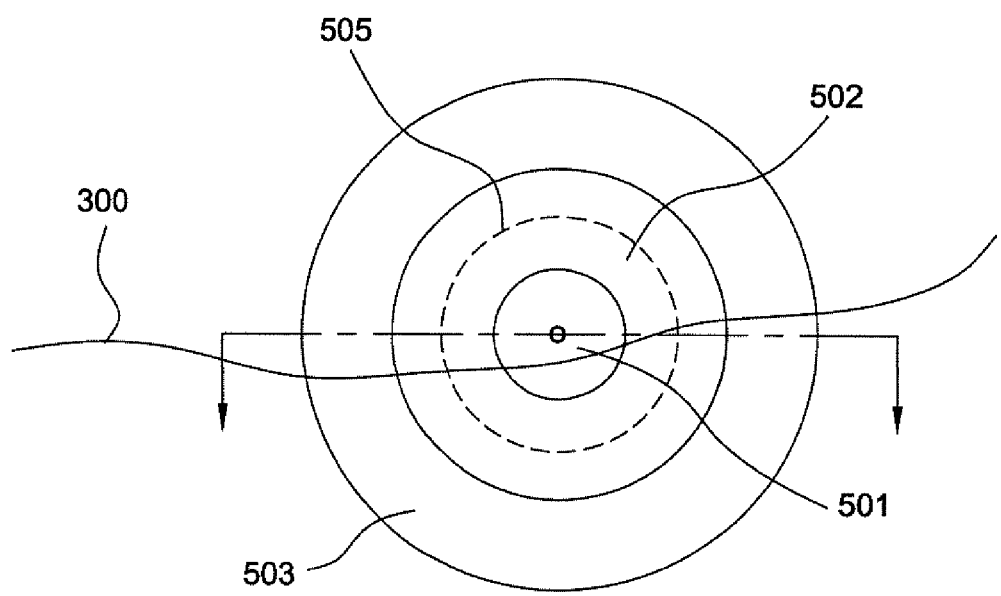

FIGS. 5a and 5b show respectively a view in section and a top view illustrating the positioning of a unitary sensor with respect to a micromachined PSJA microactuator in an exemplary embodiment of the invention.

With reference to FIG. 5a, a PSJA microactuator 500 can also, according to a technique of the prior art known per se, be made using a micromachining technique by two metal layers forming two annular electrodes 503 and 505, respectively above and below a dielectric substrate 501.

With reference to FIG. 5b, the electrodes 503 and 505 can be two planar rings the centres of which are aligned on a vertical axis. The ionized air or plasma can then be included in a zone 502 situated above the surface of the substrate 501, that is substantially annular, and situated inside the first annular electrode 503 and above the second annular electrode 505.

It is then possible to place the optical fibre 300 so that a sensor node is situated close to a zone 502 occupied by the plasma: for example by sinking the fibre into the dielectric substrate 501, or by sinking it into the structure situated beneath the dielectric substrate 501, which can for example be the structure of an aircraft wing.

In one embodiment of the invention, the optical fibre 300 can also be made directly within the dielectric substrate 501, for example by a cavity in which layers of material are microdeposited forming fringes of an interference network in order to form the plurality of sensors.

Figure 6:
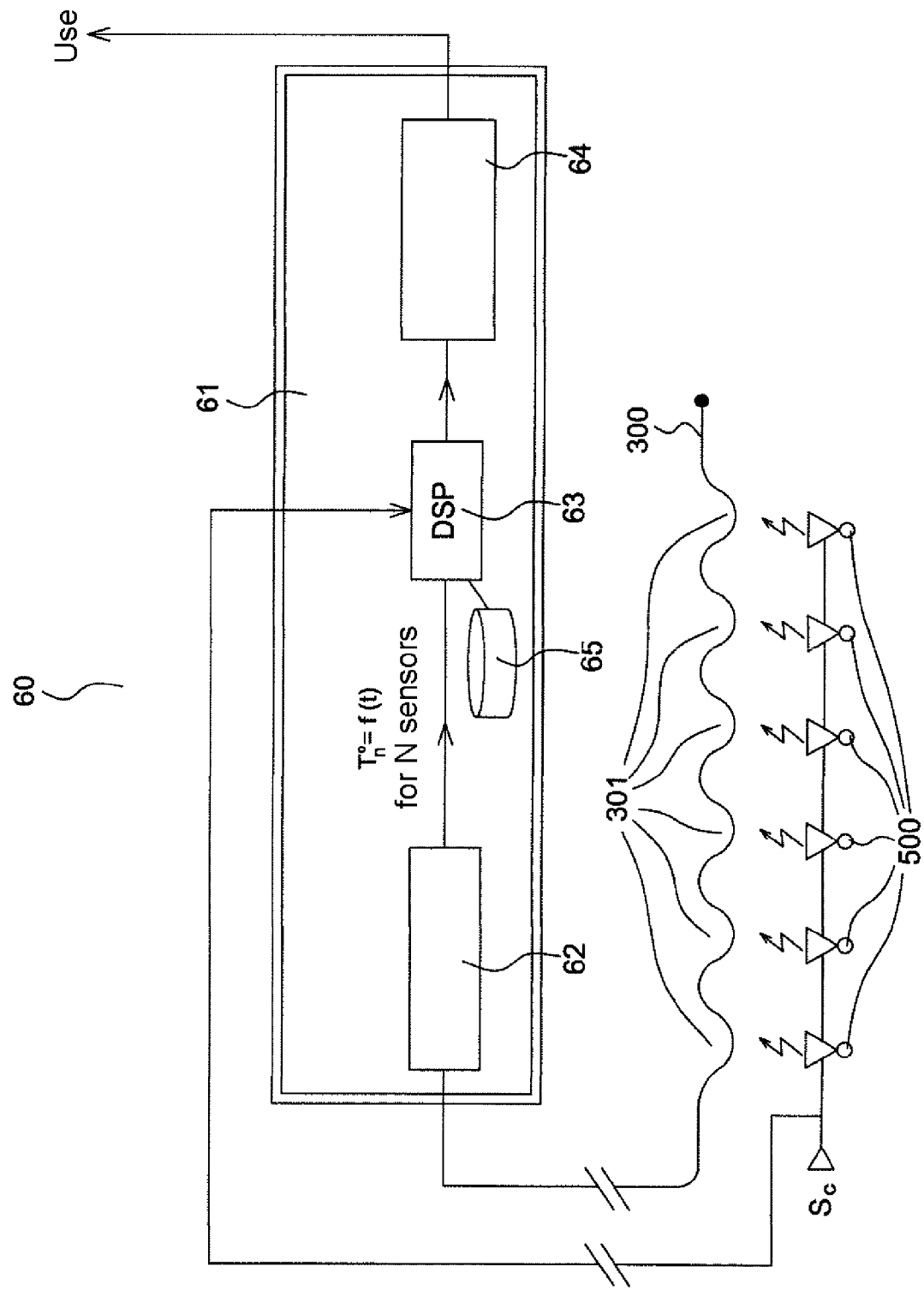
FIG. 6, as a block diagram, a diagram illustrating a monitoring device according to an exemplary embodiment of the invention.

FIG. 6 shows, as a block diagram, a diagram illustrating a monitoring device according to an exemplary embodiment of the invention.

In a preferred exemplary embodiment of the invention, a monitoring device 60 may comprise a processing unit 61. The processing unit 61 may comprise an optoelectronic polling device 62 comprising for example an emitter, not shown in the figure, emitting a laser beam in the optical fibre 300. The optical fibre 300 comprises, in the example illustrated by the figure, a plurality of sensor nodes 301 forming a Bragg network, the sensor nodes each being placed close to microactuators 500. The polling device 62 may also comprise a receiver not shown in the figure. The polling device 62 can be connected to a signal processing device or "DSP" 63. Advantageously, the DSP 63 is connected to a processing and diagnostic device 64 capable of communicating with a central system for monitoring the system in which it is incorporated, allowing, for example, a user to view alarms in the event of malfunction. The DSP 63 notably makes it possible to establish a comparison between the received signals, which are representative of the signatures of the items of equipment placed close to the sensor nodes 301, and the reference templates characteristic of their correct operation, in order to generate a signal representative of the correct operation of the latter. The reference templates can, for example, be stored in a database 65 communicating with the DSP 63.

Advantageously, the monitoring device 60 comprises means for synchronizing the comparative analysis of the signals with the commands for actuating the microactuators 500, these commands being represented by a command signal Sc. The means for synchronizing the comparative analysis of the signals can for example be implemented in the DSP 63. Specifically it is possible to know in advance the microactuator for which the correct operation must be monitored, since the microactuators are typically commanded by a command device.

The embodiment of the comparative analysis between the stored reference signature and the measured signature is of any known type, for example a waveform template, or digital signal processing by Fourier transform, or any other known method.

The embodiment described has the advantage of adding no complexity to the monitored actuator system while introducing very simple additional members: the optical fibre 300 and the processing unit 61. The aforementioned first drawback of the prior art, that is to say the drawback associated with increasing complexity, is thus resolved.

The embodiment described offers the advantage of a total price reduced to that of the fibre sensor; the aforementioned second drawback of the prior art, that is to say the drawback associated with cost, is thus resolved.

The embodiment described also offers the advantage of a total space requirement reduced to that of the fibre sensor; in particular, the outlying space requirement close to the actuators is reduced to the fibre; the aforementioned third drawback of the prior art, that is to say the drawback associated with space requirement, is thus resolved. In the same manner, the fourth drawback, that is to say the drawback associated with weight, is resolved, in particular in the zone of the actuators, The power consumption for the whole device according to the invention is minimized by the time-multiplexed nature of the Bragg network sensors; the aforementioned fifth drawback, that is to say the drawback associated with power consumption, is thus resolved.

It should be noted that the only failure mode of each node of a monitoring device 60 of an optical nature as described above is the total or partial breakage of the optical fibre 300. Such a breakage has no functional effect on the system into which the monitoring device 60 is incorporated. Therefore, the penalty in reliability provided by the monitoring device 60 is zero with respect to the system into which it is incorporated.

The aforementioned seventh drawback of the prior art, associated with the penalty surrounding the reliability of the actuators, is thus resolved.

Moreover, the optical nature of the Bragg network sensors makes the latter immune to thermal and electric environments and to impacts and vibrations when the latter are appropriately maintained in the system into which they are incorporated; that is to say, for example in the case of an aircraft wing: because the latter are sunk into the structure of the wing in an appropriate manner. The aforementioned sixth drawback of the prior art, associated with susceptibility, is thus resolved.

What is claimed is:

1. A monitoring device configured to monitor a plurality of microactuators, the monitoring device comprising:
    an optical fibre including a plurality of sensors placed along the optical fibre, each sensor being placed close to but outside a microactuator in the plurality of microactuators, and having optical properties that vary as a function of at least one environmental parameter;
    a polling device for a fibre optic network comprising at least one transmitter and one receiver; and
    processing means configured to modulate the frequency of the optical signal transmitted by the transmitter to select the sensor close to a given microactuator, and configured to compare the received optical signal with a template characteristic of a correct operation of the microactuator.

2. The monitoring device according to claim 1, wherein the optical fibre is of a monomode type, and the sensors include a network of fibre optic sensors using Bragg interference networks, the processing means configured to compare the received optical signal with a thermal signature of the microactuator.

3. The monitoring device according to claim 1, wherein the optical fibre is of a monomode type, and the sensors are formed by a Bragg network, the processing means configured to compare the received optical signal with a pressure signature of the microactuator.

4. The monitoring device according to claim 1, wherein the microactuators are plasma synthetic jet microactuators.

5. The monitoring device according to claim 4, wherein the plasma synthetic jet microactuators comprise two planar electrodes made on either side of a dielectric substrate.

6. The monitoring device according to claim 5, wherein the optical fibre is placed in the structure of the dielectric substrate.

7. The monitoring device according to claim 5, wherein the optical fibre is made in a cavity formed in the dielectric substrate, the sensor being made by deposited layers of material forming fringes of an interference network.

8. The monitoring device according to claim 1, wherein the microactuators are piezoelectric actuators.

9. The monitoring device according to claim 1, wherein the microactuators are micromotors.

10. The monitoring device according to claim 1, wherein the microactuators are shape-memory alloy actuators.

11. The monitoring device according to claim 1, wherein the microactuators are artificial muscle type actuators.

12. The monitoring device according to claim 1, wherein the microactuators form a nonuniform population of actuators of different types including at least one of plasma synthetic jet microactuators, piezoelectric actuators, micromotors, shape-memory alloy actuators, and artificial muscles.

13. The monitoring device according to claim 1, further comprising synchronization means for synchronizing a comparative analysis of the optical signal with actuation commands of the microactuators.

14. An aircraft wing, comprising:
    a monitoring device configured to monitor a plurality of actuators placed on a wing surface, the monitoring device including:
        an optical fibre including a plurality of sensors placed along the optical fibre, each sensor having optical properties that vary as a function of at least one environmental parameter,
        a polling device for a fibre optic network comprising at least one transmitter and one receiver, and
        processing means configured to modulate the frequency of the optical signal transmitted by the transmitter to select the sensor close to a given microactuator, and configured to configure the received optical signal with a template characteristic of a correct operation of the microactuator,
    the sensors being placed along the optical fibre placed in the material of the wing, each of the sensors being placed close to but outside an actuator.

* * * * *